United States Patent
Michels et al.

(10) Patent No.: US 7,794,790 B2
(45) Date of Patent: Sep. 14, 2010

(54) METHOD OF PRINTING A FLUID MATERIAL USING A CONTINUOUS JET PRINTING TECHNIQUE AND CURABLE COMPOSITIONS FOR USE IN SAID METHOD

(75) Inventors: Jasper Joost Michels, 's-Hertogenbosch (NL); René Jos Houben, Nederweert (NL)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 227 days.

(21) Appl. No.: 11/884,867

(22) PCT Filed: Mar. 21, 2006

(86) PCT No.: PCT/NL2006/000148
§ 371 (c)(1),
(2), (4) Date: Nov. 5, 2007

(87) PCT Pub. No.: WO2006/101386
PCT Pub. Date: Sep. 28, 2006

(65) Prior Publication Data
US 2008/0160194 A1    Jul. 3, 2008

(30) Foreign Application Priority Data
Mar. 22, 2005   (EP) .................................. 05075678

(51) Int. Cl.
*B05D 5/00* (2006.01)
(52) U.S. Cl. ........................... 427/256; 528/15; 528/31; 528/32

(58) Field of Classification Search ................. 427/256; 106/31, 48; 528/15; 523/400
See application file for complete search history.

(56) References Cited

U.S. PATENT DOCUMENTS

| | | | |
|---|---|---|---|
| 4,303,924 A * | 12/1981 | Young, Jr. .................... | 347/102 |
| 5,453,122 A * | 9/1995 | Lyon ........................ | 106/31.37 |
| 6,467,897 B1 * | 10/2002 | Wu et al. .................... | 347/102 |
| 6,605,144 B1 * | 8/2003 | Watkinson et al. ........ | 106/31.48 |
| 6,699,956 B2 * | 3/2004 | Kudo et al. ................... | 528/15 |
| 2002/0198289 A1 * | 12/2002 | Gummeson ................. | 523/400 |

* cited by examiner

*Primary Examiner*—Duy-Vu N Deo
*Assistant Examiner*—Maki A Angadi
(74) *Attorney, Agent, or Firm*—Nixon & Vanderhye P.C.

(57) ABSTRACT

The invention relates to a method for printing a fluid material using a continuous jet printing technique, wherein the material is passed under pressure from a reservoir through a channel to at least one outflow opening of the channel, after which the material is passed through the outflow opening, whereby the pressure in at least a part of the channel upstream of the outflow opening is in the interval of 15-600 bars [$\equiv 15 \cdot 10^5$ to $600 \cdot 10^5$ Pa], and whereby the fluid material comprises a curable composition which comprises: a) a component A in an amount in the range of from 1-15 wt % which component A has a dielectric constant larger than 15 (at 0° C.); b) an ionically dissolved lipophilic salt in an amount in the range of from 1-15 wt %, c) optionally (a) coating additive(s) in an amount of at most 10 wt %, and d) for the remaining part a liquid component B which comprises a curable monomer and/or a curable oligomer, which liquid component B has a low shear viscosity (at 22° C.) in the range of from 50-1500 mPas, whereby liquid components A and B are compatible with each other, and all amounts are based upon total composition. The invention further relates to said curable composition and articles comprising said composition.

21 Claims, 1 Drawing Sheet

US 7,794,790 B2

METHOD OF PRINTING A FLUID MATERIAL USING A CONTINUOUS JET PRINTING TECHNIQUE AND CURABLE COMPOSITIONS FOR USE IN SAID METHOD

This application is the U.S. national phase of International Application No. PCT/NL2006/000148 filed 21 Mar. 2006 which designated the U.S. and claims priority to 05075678.2 filed 22 Mar. 2005, the entire contents of each of which are hereby incorporated by reference.

The invention relates to a method for printing a fluid material using a continuous jet printing technique, a curable composition for use in said fluid material, a method to form a 2D- or 3D-article, a cured article comprising said curable composition, and the use of said article.

BACKGROUND OF THE INVENTION

Radiation curing technology has been used in the graphic arts industry for more than 20 years. One key driver in the adoption of this technology for environmental and safety reasons is the reduction of volatile organic compounds, resulting from the elimination of solvents. The UV-technology has been limited to specific inkjet printing methods, which methods require either high printing temperatures or very low viscosity at room temperature. These methods can be used to form articles, such as an RP-product, RM-product or LMT-product. The UV-inks used there apply a solvent carrier. These solvents are used to control the ink viscosity and to promote adhesion to a substrate. It is further observed that typically curable compositions should contain as less solvent as possible, in order to obtain favourable physical and chemical properties of the cured composition. In addition the curable compositions should preferably contain a minimum amount of salt or no salt at all, since salt is regarded to be detrimental for favourable physical and chemical properties of the cured composition.

Inkjet printers can be divided into drop-on-demand (DOD) and continuous inkjet (CIJ) systems. In DOD systems, each drop is generated on demand as soon as the nozzle is positioned above the substrate. On the other hand, in CIJ systems a flow of ink drops is generated under constant and high pressure. The ink drops are charged and can selectively be deflected in order to obtain a desired droplet distribution across the substrate. Deflected drops can subsequently be recycled. To be charged, the ink needs to be electrically conductive.

As indicated above when used in a drop-on-demand (DOD) inkjet or in continuous inkjet (CIJ) printer, a (UV-curable) composition must have a sufficiently low viscosity. For most ink compositions, the applied viscosity is around 100 mPas at room temperature, though a more typically applied viscosity at printing temperature is less than 70 mPas in case of CIJ technology and less than 20 mPas in case of DOD technology. It will be appreciated that the viscosity of a composition can be influenced by the inkjet printing temperature.

Most conventional film forming compositions for other applications such as coatings, however, have a significantly higher viscosity, which make them unsuitable for inkjet printing processes.

Oxygen inhibition is another factor that impacts the performance of UV-curable materials. Rapid cure speeds are required to insure good print quality and production efficiency. As a result, highly functional materials are necessary. However, these materials must not exhibit high film shrinkage, which would negatively impact the ink and the adhesion of the ink. Therefore these materials are preferably applied at or close to the curing temperature. In this respect DOD technology is less favourable, as this technology needs to use the unfavourable high printing temperatures. Alternatively DOD technology needs to use very low viscosity formulations at room temperature leading to very dense networks giving brittle materials and hence are unsuitable for 3D modelling.

In conventional UV inks typically a modified epoxy, a urethane, or a polyester acrylate is used as the backbone of the ink composition. Specific epoxy chemistry, however, suffers from high molecular weights and viscosities, high film shrinkage and limited pigment capability. Hence, epoxy-based compositions are not suited for inkjet applications, since for such applications they have to contain high amounts of solvents. Furthermore, for typical cationic ring opening polymerization (epoxides and oxetanes), shrinkage may be very low, that is much lower than for acrylates and may therefore be very interesting for 3D, RP and RM. Drawbacks of these systems are, however, that polymerisation in these latter cases is relatively slow and inhibited by proton acceptors (such as water).

The use of conventional urethane and polyester acrylates brings about better overall physical properties, but their viscosities are still very high, which makes them not particularly suited for inkjet applications.

Furthermore, it is observed that conventional reactive monomers and oligomers that are typically used in UV-systems are not water-soluble, whereas traditional photo initiators have a poor compatibility with water, since they do not disperse well in water, e.g. because of their polar nature.

In an article by J. Klang and J. Balcerski from Sartomer, Pa., USA (2004), UV-curable compositions are described, which contain a monomer, an oligomer, photo-initiators, pigments and additives. These compositions are preferably free of solvent to reduce or minimize the amount of volatile organic compounds that are released upon curing the article obtained. In addition, these compositions have a low viscosity to allow their application in inkjet systems. The solvent free compositions can in particular cases be used for DOD-systems, though still relatively high application temperatures are required to decrease the viscosity of the composition.

It is observed, however, that such solvent free compositions cannot be used in continuous inkjet printing, as these compositions are not sufficiently conductive or not conductive at all.

A further disadvantage is that these compositions, when used in drop-on-demand inkjet systems, need to be heated to about 80° C. in order to give these compositions the required viscosity. An elevated temperature is in general however malicious for such compositions, because not only the stability, but also the homogeneity of such compositions at such temperatures deteriorates.

In addition, the processing of compositions at higher temperature causes the compositions to thermally shrink when deposited, which is unfavourable and therefore unwanted. Moreover, in order to heat the composition much energy is consumed, which is a further disadvantage.

U.S. Pat. No. 4,990,360 discloses electrically conductive compositions containing acrylate functional organosiloxane/oxyalkylene copolymers and a solubilized lithium salt. However, the use of these compositions is limited to the formation of gels upon curing. It is therefore not possible to form solid articles with these compositions. Furthermore, the compositions mentioned herein are solvent-based, which is not desirable, e.g. from an environmental point of view. Another disadvantage is that these compositions have only a limited range of viscosities. Furthermore the materials described in this patent are polymeric and would have viscosities that are far too high for solventless inkjet printing.

BRIEF DESCRIPTION OF THE DRAWINGS

The apparatus that can suitably be used in the method according to the present invention will presently be further elucidated with reference to the drawings, in which.

SUMMARY OF THE INVENTION

Figure 1:
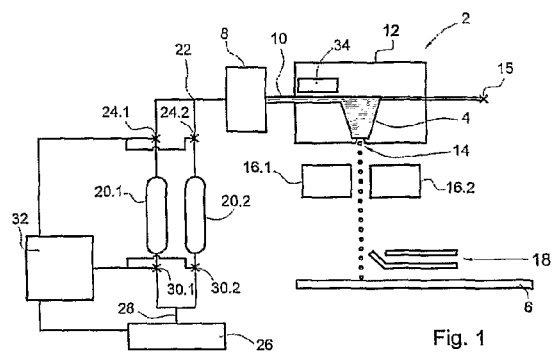
FIG. 1 is a schematic overview of an apparatus according to the invention.

The objective of the present invention is to provide a curable composition for use in a continuous inkjet printing method having an increased conductivity and a relatively high viscosity, which composition comprises only a limited amount of solvent, and preferably a minimal amount or no solvent at all.

Surprisingly, it has now been found that the above objective can be realised, by using a fluid material that comprises a liquid component with a high dielectric constant, a lipophilic salt and a liquid component having a particular viscosity.

DETAILED DESCRIPTION OF THE INVENTION

Accordingly, a first aspect of the present invention is to provide a method for printing a fluid material using a continuous jet printing technique, wherein the fluid material is passed under pressure from a reservoir through a channel to at least one outflow opening of the channel, after which the fluid material is passed through the outflow opening, whereby the pressure in at least a part of the channel upstream of the outflow opening is in the interval of 15-600 bars [$\equiv 15 \cdot 10^5$ to $600 \cdot 10^5$ Pa], which fluid material comprises a curable composition which comprises (a). a component A in an amount in the range of from 1-15 wt % which component A has a dielectric constant larger than 15 (at 0° C.), (b) an ionically dissolved lipophilic salt in an amount in the range of from 1-15 wt %, (c) optionally (a) coating additive(s) in an amount of at most 10 wt %, and (d) for the remaining part a liquid component B which comprises a curable monomer and/or a curable oligomer, which liquid component B has a low shear viscosity (at 22° C.) in the range of from 50-1500 mPas, whereby liquid components A and B are compatible with each other, and all amounts are based upon total composition.

In all curable compositions to be used in accordance with the invention, the weight % given refers to the weight percentage of respective compounds or components based on total weight of the curable composition.

Preferably, in accordance with the present invention the fluid material at the time of flowing out through the outflow opening has a viscosity which is in the interval of 150 to 400 mPas.

In the curable composition to be used in accordance with the present invention crosslinks and/or polymer type structures are formed upon curing. Liquid component B, responsible for forming crosslinks and/or polymer type structures, can comprise various sorts of polymer forming compounds, such as radiation-curable monomers/oligomers, heat curable monomers/oligomers or even broader and more simply monomers/oligomers that eventually crosslink and/or form polymer type structures, i.e. cure by themselves.

If radiation is used to cure the curable composition, UV-radiation can suitably be used, but also other forms of radiation are envisaged.

The curable composition to be used in accordance with to the present invention comprises a component A having a particular dielectric constant, which also enables the droplets to be used to obtain the charge that is required in continuous inkjet printing. The use of component A is very advantageous since it allows an improved distribution of the droplets across the substrate. Conventionally applied solvent free curable compositions, however, have a very low electrical conductivity, which makes them unsuitable for use in continuous inkjet printing.

Suitably, liquid component A is present in an amount of 1-15 wt %, preferably in an amount of 1-10 wt %, based on total composition. Preferably, component A is used in an amount of less than 10 wt. % because higher amounts may be detrimental for specific mechanical properties and should therefore be avoided, unless gel-like systems are desired. In accordance with the present invention component A is most preferably present in an amount in the range of from 3 wt. %-10 wt. %, based on total composition. If the amount of liquid component A is too low, the droplets may be insufficiently charged, whereas if the amount is too high. the physical properties of the article to be formed will be poor.

It is believed, without wishing to be bound to any particular theory, that component A amongst others acts as an electrical conductivity-enhancing medium. In addition, it is believed that the high dielectric compound supports the solubility of the lipophilic salt.

In a preferred embodiment of the present invention liquid component A has a dielectric constant in the range of from 15-89.7 (determined at 0° C.). More preferably the dielectric constant of liquid component A is in the range of from 30-89.7, even more preferable in the range of from 50-89.7. It should be noted, however, that also liquid components A could be used having dielectric constants that exceed 89.7. Typically dielectric constant values can be found in handbooks, such as the CRC Handbook of Chemistry and Physics.

If the dielectric constant of component A is too low the enhancing effect on the electrical conductivity is either too low or a too high amount of component A needs to be used in order to obtain such an effect. On the upper end there seems to be no limitation to the dielectric constant.

Suitably, liquid component A with a high dielectric constant is chosen from the group consisting of acetamide, acetone, acetonitril, amylalcohol, antimony trichloride, 1-butanol, citraconicanhydride, cyano acetic acid, deuteriumoxide, DMSO, ethanol, ethylenecyanide, formic acid, formamide, furfuraldehyde, glycerin, glycerol, glycol, hydrazine, hydrocyanic acid, hydrogen cyanide, HFl, hydrogen peroxide, hydrofluoroic acid, hadrozine, iodine, lactonitrile, lead nitrate, maleic anhydride, malonic anhydride, malonic nitrile, MEK, methanol, methyl pyrrolidones, methylthiocyanate, nitrobenzoldoxime, N,N-dimethylformamide (DMF), nitromethane, nitrosodimethylamine, p-nitro-analine, plastic grain, 1-propanol, sulphuric acid, syrup, thallium chloride, titanium dioxide, titanium oxide, trimethylsulphanilic acid, and water, and mixtures thereof. Preferably liquid component A is chosen from the group consisting of acetone, acetonitril, 1-butanol, DMSO, ethanol, formamide, formic acid, methanol, MEK, N,N-dimethylformamide (DMF), methylpyrrolidone, 1-propanol and water, and mixtures thereof.

Water is a preferred compound to be used, more preferably de-ionised water is used. If water is used in the curable composition it will contribute to the conductivity. It is noted that water is added because of its high dielectric constant and impact on the conductivity of the composition.

Thus, the present invention allows for the use of a relative small percentage of liquid component A. In combination with a lipophilic salt it is now possible to obtain a level of conductivity, which is required for droplet deflection in a continuous inkjet system.

It is noted that liquid component A is preferably removed before or during curing, because it is potentially detrimental to physical and/or chemical properties of the article to be formed.

On the other hand, if a conductive material is required, one can also use a technology that introduces conductivity after curing. Strong lasers, for instance, may sinter (fuse) metal particles into conductive tracks. These particles may be blended with the liquid curable composition beforehand.

The composition according to the present invention further comprises a lipophilic salt.

Suitably, the lipophilic salt is present in an amount in the range of from 1 to 15 wt. %, based on total composition. The amount of salt depends on the application desired. Preferably, use is made of an amount in the range of from 1 to 12 wt. %, more preferably in the range of from 1 to 10 wt. %, and even more preferably in the range of from 5 to 10 wt. %, for 3D prototyping. If the amount of the lipophilic salt is too high, the mechanical properties of the final product, such as toughness and impact strength, may be deteriorated.

Preferably, the lipophilic salt is chosen from the group consisting of Lithium salts, tetra-alkyl ammonium salts, alkyl sulphonates, derivatives of alkyl sulphonates, alkyl sulphates, derivatives of alkyl sulphates, alkyl benzyl sulphonates, derivatives of alkyl benzyl sulphonates, alkyl benzyl sulphates, derivatives of alkyl benzyl sulphates, tetra-benzylic ammonium salts, derivatives of tetra-benzylic ammonium salts, tri-alkyl monobenzylic ammonium salts, derivatives of tri-alkyl monobenzylic ammonium salts, di-alkyl dibenzylic ammonium salts, derivatives of di-alkyl dibenzylic ammonium salts, mono-alkyl tri-benzylic ammonium salts, derivatives of mono-alkyl tri-benzylic ammonium salts, salts of cholic acid, salts of derivatives of cholic acid, derivatives of salts of cholic acid, derivatives of salts of derivatives of cholic acid, digitonins, derivatives of digitonins, docusates, derivatives of docusates, sarcosine, derivatives of sarcosine, benzalkonium salts, derivatives of benzalkonium salts, thonzonium salts, derivatives of thonzonium salts, salts of fatty acids and derivatives of salts of fatty acids. Preferred lipophilic salts are Li-salts and tetra-alkyl-ammonium salts and most preferred salts are Li-salts.

Preferably the Li-salt is chosen from the group consisting of $LiClO_4$, $LiCF_3SO_3$ (LiTf), LiI, $LiPF_6$, LiBr and $LiBF_4$, even more preferably the salt is chosen from $LiClO_4$ and LiTf.

The curable composition to be used in accordance with the invention has suitably a conductivity (20° C.) of 50-5000 µS/cm, preferably from 100-1000 µS/cm, and more preferably from 200-500 µS/cm.

Naturally, one can vary the conductivity of the curable composition by adding more or less salt and/or water. Alternatively, one can choose particular monomers/oligomers, as the conductivity will also dependent on the viscosity of the curable composition The conductivity is measured with a Jandel 4-point probe equipped with an Ecolab galvanostat, which provides for a 4-point measurement.

The curable composition to be used in the present method may further comprise one or more generally used coating additives. Suitably, the amount used is at most 10 wt %, preferably in the range of from 1-5 wt %. The present composition may contain virtually none or no further additive at all, if the amount of salt alone is high enough to achieve the required conductivity.

The coating additives can be chosen from the group of pigments, dyes, colorants, flow promoters, anti oxidants, filters, fillers, stabilizers, metal particles, compatibilizers, metal deactivators, metaloxides, blowing agents, waxes, processing aids, wetting agents, and adhesion promoters.

Any compound known in the field from the group of pigments, dyes, colorants, flow promoters, anti oxidants, filters, fillers, stabilizers, metal particles, compatibilizers, metal deactivators, blowing agents, waxes, processing aids, wetting agents, and adhesion promoters, which can in general be added to a curable composition in an amount sufficient to obtain the desired effect and/or to fulfil the desired function for such a compound.

Typical examples of fillers are silica, $TiO_2$, $CaCO_3$, $Mg(OH)_2$, $Mg_2O$, carbon black, etc.

Additionally, blowing agents may be present in the curable compositions to be used in the present method. The presence of such a blowing agent enables the formation of a polymer foam, when the composition is extruded. Examples of such blowing agents are volatile hydrocarbons, hydro fluorocarbons, and chlorofluorocarbons.

It could be beneficial or desired to add compounds such as colorants and adhesion promoters (e.g. if one wants to improve the layer-to-layer adhesion in a 3D ink jetted RP or RM article).

The curable composition to be used in the present method comprises a liquid component B. The viscosity of the liquid component B used at inkjet printing temperature must be sufficiently low, i.e. in the range of from 50 to 2000 mPas. The viscosity is measured using a Physica UDS200 Rotational Rheometer using either a cone-plate (cone diameter: 5 cm, cone angle=1°) or cup-spindle geometry. Alternatively, the viscosity was measured using an Anton-Paar AMVn Microviscosimeter, based on the dropping ball method. In the context of the present invention, the inkjet printing temperature resembles conventional inkjet temperatures, which are normally in the range of from 20° C. to 80° C.

Liquid component B has a viscosity at inkjet printing temperature in the range of from 50-2000 mPas. Preferably, the viscosity at inkjet printing temperature is in the range of from 50 to 1000 mPas, more preferably in the range of from 50 to 500 mPas, even more preferably in the range of from 50 to 200 mPas.

In a preferred embodiment the liquid composition B to be used has a "low shear viscosity" (22° C.) in the range of from 50-1500 mPas, preferably from 50-1000 mPas, more preferably from 50-500 mPas and most preferably from 50-100 mPas. The low shear viscosity is measured using a Physica UDS200 Rotational Rheometer using either a cone-plate (cone diameter=5 cm, cone angle=1°) or cup-spindle geometry. Alternatively, the viscosity was measured using an Anton-Paar AMVn Microviscosimeter, based on the dropping ball method.

If a liquid shows Newtonian behaviour, low shear viscosity is the same as viscosity, as the viscosity is not dependent on the shear rate.

Suitably, liquid component B is present in an amount in the range of from 30 to 90 wt. %, preferably from 70 to 90 wt. %, based on total composition.

Since the major part of the curable composition usually consists of liquid component B, the curable composition has suitably a viscosity at inkjet printing temperature in the range of from 50-2000 mPas. Preferably, the viscosity at inkjet printing temperature is in the range of from 50 to 1000 mPas, more preferably in the range of from 50 to 500 mPas, even more preferably in the range of from 50 to 200 mPas.

In a preferred embodiment, the curable composition to be used according to the invention has a "low shear viscosity" (22° C.) in the range of from 50-1500 mPas, preferably from 50-1000 mPas, more preferably from 50-500 mPas and most preferably from 50-100 mPas.

Liquid component B may suitably comprise one or more types of curable monomers that provide a low viscosity, enhance cure speed and improve adhesion. It is believed that the curable monomer or mixture of curable monomers functions as a reactive diluent, as a crosslinker and/or polymer former, as well a performance property enhancer. Typically, the curable monomers will have a molecular weight, which is less than that of the curable oligomers. The functionality of the curable monomers may vary. Suitably, mono-, di- and tri-functional monomers are used, but monomers with higher functionalities may also be applied.

Suitably, the curable monomer, or a mixture comprising curable monomers, is present in an amount in the range of from 0 to 100 wt. %, preferably from 30 to 90 wt. %, more preferably from 70 to 90 wt. %, based on total amount of liquid component B.

A large variety of curable monomers can be used in accordance with the present invention, thus enabling formulators to achieve the right performance properties for the desired application, such performance properties include for instance density and the amount of crosslinking and or polymer formation upon curing resulting in more or less hardness, etc.

Suitably the viscosities of the individual curable monomers can range from 4-250000 mPas at inkjet printing temperature, preferably they range from 50-100000 mPas, more preferably they range from 100-10000 mPas. In case when a monomer is used with a very high viscosity, e.g. 200000 mPas, the viscosity of the liquid component B is lowered by adding at least one monomer with a low viscosity, in order to form a mixture that has an adequate viscosity at printing temperature.

Preferably, the curable monomer is chosen from the group consisting of methacrylates, acrylates, epoxies, oxetanes, epoxy/acid combinations (e.g. those that are cured using IR radiation), epoxy/amine combinations (e.g. those that are cured using IR radiation), vinyl derivatives, maleimides and allyl derivatives. Preferred curable monomers are acrylates and/or methacrylates.

Preferably, the methacrylate and/or acrylate curable monomer is chosen from the group consisting of BisGMA, HEMA, TEGDMA, SR344 (Cray Valley), ethylene glycol-based acrylates, wherein the ethylene glycol-based chains have different lengths, DPGDA, TPGDA, TIEGDA, PONPGDA, TCDDMDA, oligo (ether) acrylates, poly(ether) acrylates, urethane acrylates, epoxy acrylates, amine acrylates and poly (ether) acrylates with any grade of functionality. The active component in SR344 is an oligo(ethylene glycol) functionalised diacrylate.

The curable oligomer of liquid component B is usually used in smaller quantities than the monomers to provide the desired film forming properties and sufficient pigment dispersion. On the contrary some oligomers, such as polyether acrylates, have already a low viscosity. In the latter case only little or no monomer is required for viscosity reduction. It is noted that film-forming properties are dependent on the interaction between ink and substrate, which include wetting properties. It is further noted that oligomers have similar film forming properties as monomers. The same holds for pigment dispersion. The use of specific oligomers may, for instance, decrease network density to get tougher (less brittle) materials. The use of specific oligomers may further reduce polymerisation shrinkage. It is believed that polymerization shrinkage reduction is a natural consequence of a more open network structure (less crosslinks per unit volume).

Suitably, the a curable oligomer is present in an amount in the range of from 0 to 100 wt. %, preferably from 30 to 90 wt. %, more preferably from 70 to 90 wt. %, based on total amount of liquid component B.

Suitably, the curable oligomers used have a molecular weight (Mw) in the range of from 400-30000. It is believed that they determine the finished article's predominant physical properties, such as density and hardness. As stated above, oligomers, compared to monomers, reduce crosslink-network density, which generally leads to a reduction in hardness and an increase in toughness. A large variety of curable oligomers can be used in accordance with the present invention, thus enabling formulators to obtain the right performance properties for the desired application. Such properties include density, and the amount of crosslinking upon curing. Suitable types of curable oligomers include acrylated urethanes, epoxies, epoxides, epoxy acrylates, oxetanes, phenolics, carbonates, ethers, polyesters and/or acrylics, with any grade of functionality. Liquid component B may comprise one or more types of curable oligomers.

Liquid component B may comprise one or more types of so called dual cure monomers and oligomers. These dual cure monomers and oligomers combine e.g. acrylate and epoxide or oxetane functionalities in one molecule.

It will be understood that curable monomer(s) and/or the curable oligomer(s), which form a polymer, must be present in an amount to achieve sufficient crosslinking and/or polymer formation upon curing. The amount of crosslinking and/ or polymer formation may vary from application to application. The curable monomer and/or the curable oligomer can be interchanged relatively easily, e.g. in respect to the ability to form crosslinks, the viscosity and amounts.

The curable composition to be used in the present method has the advantages that it can be used at relatively low temperature, such as ambient temperature, and that it has an improved conductivity. A further advantage is that the curable compositions in accordance with the present invention are very environmentally friendly since the amount of solvent used can be very low or virtually zero. In addition such a composition can more easily be cured.

A further advantage of the curable composition to be used is that it comprises a broad spectrum of available curable monomers and oligomers, that it can be used e.g. in inkjet at a lower temperature, such as an ambient temperature.

In addition, the curable composition to be used can be cured, either while depositing and/or after depositing such a composition, or both.

The curable composition to be used in the present method can be deposited drop by drop, preferably by inkjet printing technology forming a 2D and/or 3D article. Such an article can comprise more than one cured curable composition, thus allowing the incorporation various desirable chemical and/or physical properties in the article. It is therefore possible that part of such an article according to the invention may be conducting, non conducting, and semi-conducting.

When an open network is desired in the article to be formed preferably a large amount of oligomer(s) is used, whereas when a more closed network is required, preferably a larger amount of monomer(s) is used. In the latter case the monomer(s) may have a high functionality.

Also envisaged is a system wherein separate fractions form the curable composition to be used in the present method during the inkjet printing process. The fractions may be present in separate containers, which fractions can be deposited or printed by e.g. a multi nozzle device (e.g. an epoxy-amine composition). Preferably, however, the composition is homogenous prior to curing. Therefore preferably the composition is blended prior to printing.

The curable composition to be used in the present method may further comprise a compatibilizer. With the term "compatibilizer" a compound is meant that compatibilizes one component of the curable composition with another component, such as the lipophilic salt present in the composition and the monomer and/or the oligomer of component B.

It is noted that in some cases the components will be compatible by their nature and/or one of the components may also act as a compatibilizer, e.g. SR 344.

Suitably, such a compatibilizer is present in an amount of 0.2-10 wt. %, preferably in an amount of 1-5 wt. %, based on total composition.

A compatibilizer may further be necessary in order to accommodate the component A, e.g. water. The choice of a compatibilizer will depend on other components present, which other components may have by their nature an inherent compatibilizing effect on component A or on the contrary, a de-compatibilizing effect. It is further noted that when water is added, in some cases a compatibilizer, such as HEMA, may be necessary, whereas in other cases with the presence of reasonable amounts (more than 20%) of (other) water-soluble compounds such as acrylates, such as oligo- or poly(ethylene oxide)-based ether acrylates, such as e.g. SR344, no compatibilizer may be required. The person skilled in the art will know how to chose such a compatibilizer, whenever necessary, and in what amount.

In another embodiment, the curable composition to be used in the present method may further comprise an activator, preferably in an amount in the range of from 0 to 10 wt. %, based on total composition. Depending on the type of monomers and/or oligomers used, an activator may need to be present to cure the system, which activator can be a photo initiator.

For UV and E-beam curing, an activator (or initiator) needs to be present. Such an activator is preferably present in an amount in the range of from 0.01 to 5%, based on total composition.

Also when acrylate mixtures are cured using thermal energy, a thermal initiator should be present.

No initiator is required for the curing of acrylate mixtures using γ-rays. Further, no initiator is required to cure epoxy/acid or epoxy/amine systems.

Suitable initiators for e.g. acrylic systems include benzophenone, benzyl dimethyl ketal and 2-hydroxy-2-methyl-1-phenyl-1-propanone, as well as commercial photoinitiators sold by Ciba Geigy, such as Irgacure® 184, 819, 500, 784 and 2959.

Suitable initiators for cationic systems (epoxides and oxetanes) include $SbF_6^-$, $PF_6^-$ and $BF_4^-$-salts of arylsulfonium and aryliodonium cations. Commercially available examples sold by Dow are Cyracure® UVI 6974 and UVI 6990.

The present invention also relates to a method for preparing a 2D- or 3D-article, wherein the article is prepared by depositing droplets of the fluid material on a substrate, and wherein the droplets are allowed to cure when deposited on the substrate.

Another aspect of the present invention relates to the curable composition to be used in the method according to the present invention. Hence, the present invention also provides any of the curable compositions as defined hereinbefore.

Suitably, the 2D article thus prepared is an article with one small dimension such as a line, whereas with the 3D article any article is meant with a specific length, width and height. Both 2D and 3D articles may be articles comprising one or more distinguishable parts, which parts by themselves are also 2D or 3D articles, such as individual conducting tracks.

Preferably, the article comprises an RP-product, an RM product, an LMT product, a coating, a polymeric ionic medium, a label, a battery or a code.

Also articles are envisaged such as prints on surfaces, electronic circuits, photographs, batteries, bar codes, coding bottle, can, boxes etc.

The invention further relates to an article comprising the curable composition as defined hereinabove. Preferably such an article is cured.

Another class of attractive articles that can be made using the method according to the present invention are biocompatible bone implants. These implants can advantageously be manufactured at room temperature instead of high temperatures, which is crucial for bio applications since proteins are destroyed at high temperatures.

The invention also relates to the use of an article according to the present invention.

Typically, the article according to the invention is arranged onto a substrate. Hence, the present invention provides an article, which is arranged onto a substrate. The article may have a part that has been chosen from the group of conducting sub-parts, non-conducting parts and semi-conducting sub-parts.

Within such an article one can adjust the conductivity of a specific part as desired, and form sub-parts with various conductivities, as desired. Some parts can e.g. be conductive, whereas other parts can be non-conductive, or isolating, or semi-conducting. Suitably, the resistivity for a conductive part is less than $10^{-5}$ Ω/m, whereas for a non-conductive part it is suitably larger than 1 Ω/m and for a semi-conductive part it is suitably in the range of from $10^{-5}$ Ω/m. Hence, the man skilled in the art can form relative complicated (micro)structures, such as conductive wires connecting electrical components, housings, such as for mobile phones, heat dissipating structures, etc.

Preferably, in the method in accordance with the present invention use is made of an apparatus which comprises a reservoir for storing the fluid material, a channel connected with the reservoir, which is provided with at least one outflow opening from which, in use, flows a jet of the fluid material breaking up into drops, and a pressure regulating mechanism for varying the pressure of the fluid material upstream of the outflow opening for the purpose of obtaining the jet breaking up into drops, the apparatus being further provided with pressure generating means for passing the fluid material under a predetermined pressure through the channel in the direction of the outflow opening, whereby the pressure generating means are arranged for applying the predetermined pressure to the fluid material in the channel hydraulically and/or pneumatically.

Hydraulically is understood to mean: using a liquid; and pneumatically is understood to mean: using a gas. Through the ability to apply the defined pressure to the fluid material in the channel utilizing a gas and/or a liquid, a fluid material can be passed through the channel in the direction of the outflow opening in a stable manner at a very high pressure, much higher than 8 bars.

The uniformity of the drops in the jet breaking up into drops, also at higher working pressures, is only dependent on the pressure regulating mechanism instead of being dependent on both variation in the working pressure and the variation resulting from the pressure regulating mechanism.

Such an apparatus permits new applications such as Rapid Prototyping.

Preferably, in such an apparatus the pressure generating means comprise a gas source coupled to the reservoir and/or the channel via a gas connection. With the gas source, the viscous fluid in the channel can be adjusted to both a high and at the same time a constant pressure of for instance 200 bars [≡200·10$^5$ Pa]. It is important that the pressure be as constant as possible, because in the event of irregular pressure fluctuations the viscous fluid cannot be passed through the channel and through the outflow opening in a sufficiently gradual manner. Such irregular pressure fluctuations have as a consequence that the quality of the printed result is insufficient.

By virtue of the high pressure, it is possible to print the fluid materials described hereinbefore when being processed. An embodiment of said apparatus is characterized in that the gas source comprises a gas bottle.

In a preferred embodiment the apparatus is further provided with a plunger pump connected with the gas bottle via a gas connection with a cock, for pressurizing the gas bottle, and that the gas bottle is connected via a cock with the reservoir and/or the channel. The gas bottle here functions as a buffer. The gas bottle serves for building up the above-mentioned pressure in the channel, while the flow rate of the gas flowing out of the gas bottle can be relatively low. This means inter alia that the gas bottle can be made of relatively small design. After the pressure in the gas bottle has fallen during use, the gas bottle can again be adjusted to a desired pressure with the aid of the plunger pump. For this purpose, the cock in the connection between the plunger pump and the gas bottle is opened, while the connection between the gas bottle and the reservoir/channel can be closed. Since the gas bottle may be relatively small, it is possible to realize a practical compact embodiment of the apparatus.

In a preferred embodiment the apparatus is characterized in that the gas source comprises a second gas bottle coupled to the reservoir and/or the channel via a gas connection with a cock. The second gas bottle may be coupled to the plunger pump or to a second plunger pump. According to this embodiment, one of the gas bottles can be used for adjusting the channel to, and keeping the channel at, a required pressure, while the other gas bottle, adjusted to a desired pressure, is ready to take over this task. Thus, the apparatus can function without interruption. Optionally, the cocks can be driven by an automatic control system.

In particular, the predetermined pressure is a pressure between 15 and 600 bars.

A particularly attractive embodiment the apparatus is characterized in that the pressure regulating mechanism comprises a movable control pin, which control pin can be moved in a longitudinal direction towards/away from the outflow opening, so that an end of the control pin can be placed at a predetermined distance, for instance in the distance interval of 15-500 μm, from the outflow opening, for varying the pressure adjacent the outflow opening. In use, the control pin vibrates with the desired drop frequency for varying the pressure adjacent the outflow opening. The control pin is situated, for instance, in the channel, the longitudinal direction being directed preferably substantially perpendicularly to the plane of the outflow opening. Due to the distances in the distance interval being relatively small, a relatively large pressure regulating range is realized. Thus, also at a relatively high pressure in the channel, a sufficiently large pressure regulating range (about 10% of the pressure in the channel) can be achieved. The control of the control pin in the distance interval is preferably carried out with a relatively accurate pressure regulating mechanism, in view of the relatively small distances. The precise distance interval in which the control pin is operatively regulated depends on the viscosity of the fluid material.

In the printing of fluid materials having a particularly high viscosity, work is done at an average relatively high pressure in the channel and so a relatively large regulating range is required. To achieve this, the distance from the end to the outflow opening should be relatively small to realize the above-mentioned relatively large pressure regulating range. In known systems that work with pressures up to 5 Bars [≡5·10$^5$ Pa], this distance is, for instance, in the order of 1.5 mm. For the pressure regulating mechanism according to the invention, therefore, this distance is preferably considerably smaller.

The pressure regulating mechanism can comprise a piezo element for driving the movable control pin. With the piezo element, an accurate control can be achieved. The piezo element is preferably insulated with a thermal screening (insulating ring) of optionally heated fluid, to ensure an accurate functioning of the pressure regulating mechanism (see also the Description of the Drawings). Because the end of the control pin has a relatively small surface area of, for instance, 10 mm$^2$, it is possible, with a relatively small driving force of up to, for instance, 100 N on the control pin, to effect a relatively large pressure variation of, for instance, 30 bars [≡30·10$^5$ Pa] and thereby to realize a sufficiently large pressure regulating range. The pressure regulating mechanism is therefore suitable in particular for use in said apparatus.

An advanced embodiment of the apparatus that can suitably be used in the method according to the present invention is characterized in that a diameter of the outflow opening is in the interval of 20-100 μm. Preferably, the longitudinal direction of the control pin is directed transversely to the outflow opening.

According to a preferred embodiment said apparatus is provided with a regulable heating element for heating (temperature range 15-700° C.) the viscous fluid in the channel. By regulating the temperature of the fluid, the fluid can acquire a particular viscosity for the purpose of processing (printing). This makes it possible to print viscous fluids such as different kinds of plastic and also metals (such as solder).

Discussion of Preferred Embodiments

Referring now to the drawings, FIG. 1 shows schematically an apparatus 2 for printing a fluid material 4 on a plate- or sheet-shaped material 6 by means of a continuous jet printing technique. The apparatus comprises a reservoir 8 for storing the fluid material 4 and a channel 10 connected with the reservoir 8. The channel 10 connects the reservoir 8 with the printhead 12. The channel in the printhead 12 is provided with at least one outflow opening 14 through which the fluid material 4 exits under pressure in the form of a jet breaking up into drops, in order for these drops, after being selectively deflected, or directed, to be printed on the material 6. A transverse dimension of the outflow opening 14 can be in the interval of 30-100 μm.

In this example, the channel 10 comprises a portion downstream of the outflow opening 14 which is provided with a cock 15. By opening the cock 15, the printhead 12 can be flushed with a flushing material/flushing ink which is present in the channel.

The apparatus 2 is a printer of the continuous jet-type, whereby a continuous stream of drops to be printed is formed, in contrast to a printer of the Drop-on-demand type where drops are delivered through the outflow opening only if the printhead has been activated to that effect. For the purpose of forming a jet breaking up into drops, the apparatus 2 is provided with a pressure regulating mechanism for varying the pressure of the fluid material 4 upstream of the outflow opening.

The apparatus 2 in this example is provided with a directing system 16.1, 16.2 enabling the drops to be deflected in two directions for determining the print location of the drops on the material 6. To that end, the directing system 16.1, 16.2 is provided, for instance, with a charge electrode by means of which the drops can be provided with an electric charge. Also, the directing system 16.1, 16.2 may be provided with, for instance, a capacitor by means of which electrically charged drops can be deflected in their path. Further, the apparatus 2 may be provided with a collecting gutter 18 by which particular drops can be captured, so that these drops are not printed on the material 6.

The apparatus 2 is provided with pressure generating means for passing the fluid material 4 under a predetermined pressure through the channel in the direction of the outflow opening 14. The pressure generating means are arranged to apply the predetermined pressure to the fluid material 4 hydraulically and/or pneumatically. In this example, the pressure generating means comprise a gas source which in this example comprises two gas bottles 20.1, 20.2 which are filled, for instance, with nitrogen. The gas bottles 20.1, 20.2 are connected via a (gas) connection 22 with the reservoir 8. Optionally, in the (gas) connection between the gas bottles and the reservoir 8, a pressure regulating valve is included (not shown) for keeping the pressure constant. In use, the pressure in the gas bottles will be higher than the desired pressure that is regulated by means of a pressure regulating valve. When the pressure in one of the bottles falls below the desired pressure, a switch can be made to the other bottle. In a practical variant, the connection 22 terminates in an upper side of the reservoir 8, so that a gas pressure can be applied to a surface of the viscous fluid in the reservoir 8. The channel 10 for the transport of the viscous fluid material 4 can be connected to the reservoir 8 on a bottom side thereof.

In the connection 22, cocks 24.1, 24.2 are included, by means of which it can be determined which gas bottle is or which gas bottles are in open communication with the reservoir 8. The cocks can also be designed as, or with, a pressure regulating valve. In that case, there is no open communication involved anymore. A gas bottle being in open communication with the reservoir 8 can provide the reservoir 8 with pressure. Under this pressure, viscous fluid 4 accommodated in the reservoir is forced through the channel 10 to the outflow opening 14 in the printhead 12. Next, the viscous fluid material 4 is forced through the outflow opening 14 to the material 6.

The apparatus 2 according to FIG. 1 is further provided with a plunger pump 26 which, via a connection 28 including cocks 30.1, 30.2, is in communication with the gas bottles 20.1, 20.2. With the plunger pump 26, the gas bottles (if the respective cocks 30 are open) can be adjusted to a desired pressure. This pressure can be, for instance, in the interval of 20-300 bars [$\equiv 20 \cdot 10^5$ to $300 \cdot 10^5$ Pa]. While the apparatus (printhead 12) is in operation, the gas bottles 20.1, 20.2 can be alternately in communication with the reservoir 8. This means, for instance, that in a first phase the gas bottle 20.1, via connection 22 with an open cock 24.1, is in open communication with the reservoir 8. The cock 24.2 and the cock 30.1 are closed. The cock 30.2 can then be temporarily opened, so that the plunger pump 26 can adjust the gas bottle 20.2 to the required pressure via the connection 28, without thereby causing irregular pressure disturbances in, for instance, the channel 10. As soon as the pressure in the gas bottle 20.1 becomes too low for a proper operation of the apparatus 2, this gas bottle can be closed off from the channel 10 by closing the cock 24.1. The gas bottle 20.2 can take over the task from gas bottle 20.1, for which purpose the cock 24.2 is opened. Thus, the gas bottles can be utilized in such a way that the apparatus 2 can function continuously. In the example of FIG. 1, the apparatus is provided with an automatic control system 32 for operating the cocks 24.1, 24.2, 30.1, 30.2, the gas bottles 20.1, 20.2 and the plunger pump 26. Thus, an automatic and good cooperation of the various parts is obtained. The gas bottles serve, in use, to provide the channel with a particular pressure, while the flow rate of the gas flowing from the gas bottles can be relatively low. For that reason, among others, it is possible, without any objection, that the gas bottles 20.1, 20.2 are relatively small (or, in the case where the apparatus is designed with just one gas bottle, the gas bottle can be relatively small), so that the apparatus 2 can be made of relatively compact design.

The apparatus 2 is preferably provided with a heating element 34 for adjusting the viscous fluid to a desired temperature. By adjusting the temperature of the viscous fluid, the viscosity of the fluid can (to some extent) be (additionally) regulated. The heating element may be included in the printhead 12 in or near the channel 10.

Figure 2:
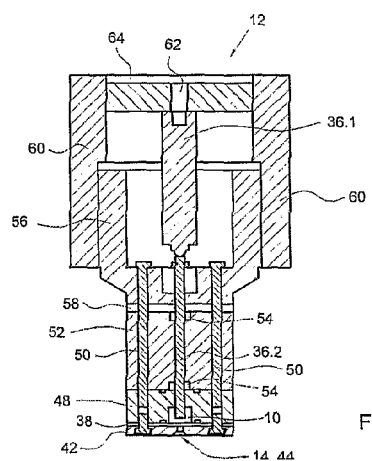
FIG. 2 is a schematic cross section of a printhead of an apparatus according to FIG. 1.

FIG. 2 shows a cross section of a printhead 12 which can be used in the apparatus 2 according to the invention. The printhead 12 comprises a pressure regulating mechanism for varying the pressure of the viscous fluid exiting through the outflow opening 14 in a predetermined, regular manner. In this example, the pressure regulating mechanism comprises a piezo element 36.1 and a movable control pin 36.2. The piezo element 36.1 is a regulating element by means of which the control pin 36.2 can be driven, allowing the control pin 36.2 to be moved in a longitudinal direction of the control pin 36.2 towards/away from the outflow opening 14, for varying the pressure adjacent the outflow opening 14. The control pin 36.2 is movable, such that an end 37 of the control pin 36.2 is displaceable relative to the outflow opening 14 in the nozzle plate 38 by a regulable distance which is in an interval distance of 15-500 μm (reference may be had to FIG. 3). For particular applications where a viscous fluid having a particularly high viscosity of, for instance, 300 mPas, is printed, an interval distance of 15-30 μM can be used.

Owing to the end 37 having a relatively small surface area, for instance 1-5 mm$^2$, it is possible, through relatively small driving forces generated by the element 36.1, via the end 37 of the control pin 36.2, to effect relatively large pressure variations adjacent the outflow opening 14. The driving force then amounts to, for instance, 250 N. By creating pressure variations in a regular manner via the driving force, a uniform distribution of the drops of the viscous fluid exiting through the outflow opening is obtained. As an indication of the size of the pressure regulating range, it may serve as an example that at an average pressure in the order of magnitude of 200 bars [$\equiv 200 \cdot 10^5$ Pa] in the channel 10, the desired pressure regulating range is in the order of magnitude of about 40 bars [$\equiv 40 \cdot 10^5$ Pa].

Figure 3:
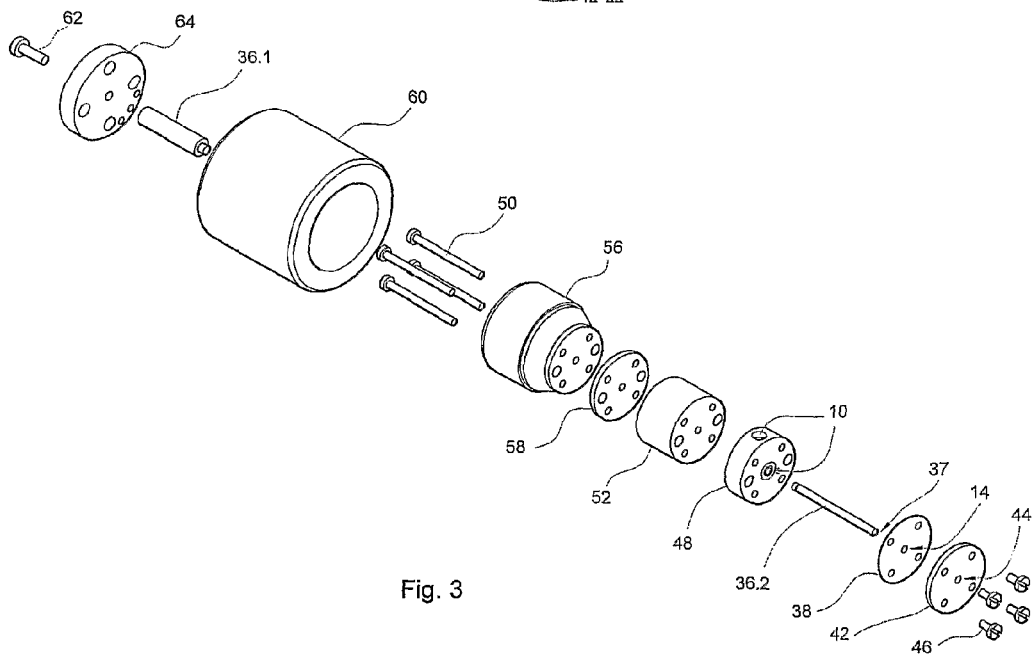
FIG. 3 is a schematic exploded perspective representation of the printhead according to FIG. 2.

The outflow opening 14 is included in a relatively thin nozzle plate 38 (reference may be had to FIG. 3). The nozzle plate 38 can be a plate manufactured from metal foil, of a thickness of 0.3 mm. The outflow opening 14 in the plate 38 has a diameter of 50 μm in this example.

The printhead 12 is further provided with a supporting plate 42 which supports the nozzle plate 38, so that it does not collapse under the high pressure in the channel 10 (see FIGS. 2, 3). The supporting plate is provided with an opening 44 which is situated opposite the outflow opening 14. The diameter of the opening 44 can be an order of magnitude greater than the diameter of the outflow opening 14. The supporting plate 42 can be attached with screws 46 to a first annular part 48 (FIG. 2). In this first cylinder part 48, the channel 10 is provided at least in part. Further, the cylinder part 48 is provided with a central recess through which the control pin 36.2 can be passed.

The first cylinder part 48 can be attached through screws 50 to a second cylinder part 52 and a third cylinder part 56. The second cylinder part 52 is provided with flexible sealing rings 54 (FIG. 2) which clamp inter alia against the control pin 36.2. Preferably, the sealing rings 54 can follow the movements of the control pin 36.2 by mechanical deformation without the contact surfaces of the sealing rings 54 with the control pin 36.2 moving relative to the control pin 36.2. With the sealing rings 54, a leak-free sealing is obtained, so that at least almost no viscous fluid material can leak from the channel 10.

Situated between the second cylinder part 52 and the third cylinder part 56 is a thermal screening or insulating ring 58. This insulating ring 58 may be designed as a zirconium oxide plate. The low heat conduction of zirconium oxide yields a very favorable thermal screening of the piezo element from the optionally heated viscous fluid. Such a thermal screening of the piezo element is specifically relevant at relatively high temperatures of the viscous fluid. When the viscous fluid 4 to be printed has been heated by the heating element 34 to give the fluid a particular viscosity, the insulating ring 58 can prevent disturbance of the functioning of the pressure regulating mechanism due to the operation of the piezo element 36.1 being adversely affected. The heating element may be accommodated in the first cylinder part 48. The piezo element 36.1 can optionally be provided with an active cooling, such as a water cooling.

The third cylinder part 56 can be attached to a shell-shaped body 60 in which inter alia the piezo element 36.1 can be accommodated (see FIG. 2). The piezo element is then situated between a cover plate 64 attached to the shell-shaped body 60 with a screw 62 and the control pin 36.2. The control pin 36.2 has been passed through the central openings of, respectively, the first cylinder part 48, the second cylinder part 52, the insulating ring 58, and the third cylinder part 56.

It will be clear from the foregoing that the predetermined pressure which is hydraulically and/or pneumatically applied to the fluid material 4 in the channel, having a viscosity of 150 mPas upon exit and at printing temperature, can be between 15 and 600 bars. It is also possible, however, that the predetermined pressure is between 100 and 600 bars. In that case, when using an average nozzle size, a fluid material having a viscosity of 150 mPas upon exit and at printing temperature can be printed continuously with an apparatus according to the invention. It is also possible that the predetermined pressure is between 200 and 600 bars. In that case, when using an average nozzle size, a fluid material having a viscosity of 300-400 mPas upon exit and at printing temperature can be printed continuously with said apparatus. Furthermore, it is possible that the predetermined pressure is between 300 and 600 bars. This permits, using an average nozzle size, the continuous printing of a material having a viscosity of 500-600 mPas upon exit and at printing temperature. Also, the predetermined pressure may be between 400 and 600 bars for continuously printing, using an average nozzle size, for instance a material having a viscosity of 700-800 mPas upon exit and at printing temperature.

Curable compositions according to the present invention are further described by the following non-limiting examples.

EXAMPLES

Example 1

The following curable composition was prepared (PRUV-7):

TEGDMA (73.6 g), HEMA (31.8 g) and BisGMA (71.8 g) were blended until a homogenous mixture was obtained. BisGMA was heated using a hot air gun, as it was too viscous to be handled at room temperature. The viscosity of the acrylate mixture was sufficiently low for efficient stirring at room temperature. A solution of lithium perchlorate (5.2 g) in water (17.6 g) was dropwise added to the mechanically vigorously stirred TEGDMA/BisGMA mixture. A clear and homogenous formulation was obtained. Finally, photoinitiator Irgacure 819 (2 g) was added under stirring. The formulation was left to stir in the dark until all the photoinitiator was dissolved.

The curable product obtained had the following composition:

| | |
|---|---|
| TEGDMA | 36.4 wt % |
| BisGMA | 35.5 wt % |
| 2-Hydroxyethyl methacrylate (HEMA) | 15.7 wt % |
| Water | 8.7 wt % |
| LiClO$_4$ | 2.6 wt % |
| Irgacure 819 | 1.0 wt % |

The composition obtained had the following conductivity and low shear viscosity values:

| | |
|---|---|
| Conductivity: | σ(23° C.) = 252 μS/cm |
| | σ(31° C.) = 370 μS/cm |
| Low shear viscosity: | η(22° C.) = 65 mPas |

Example 2

The following composition was prepared (PRUV-8)

Cray Valley SR344 (148 g) and BisGMA (27 g) were blended until a homogenous mixture was obtained. BisGMA was heated using a hot air gun, as it was too viscous to be handled at room temperature. The viscosity of the acrylate mixture was sufficiently low for efficient stirring at room temperature. A solution of lithium perchlorate (5.6 g) in water (19.4 g) was dropwise added to the vigorously stirred SR344/BisGMA mixture. A clear and homogenous formulation was obtained. Finally, photoinitiator Irgacure 819 (2 g) was added under stirring. The formulation was left to stir in the dark until all photoinitiator was dissolved.

The curable product obtained had the following composition:

| | |
|---|---|
| SR344 | 73.3 wt % |
| BisGMA | 13.4 wt % |
| Water | 9.6 wt % |

| | |
|---|---|
| LiClO₄ | 2.8 wt % |
| Irgacure 819 | 1.0 wt % |

The composition obtained had the following conductivity and low shear viscosity values:

| | |
|---|---|
| Conductivity: | σ(21° C.) = 230 µS/cm |
| | σ(31° C.) = 380 µS/cm |
| Low shear viscosity: | η(22° C.) = 100 mPas |

Example 3

The following composition was prepared (PRUV-11)

TEGDMA (108.2 g), BisGMA (63.2 g) and SR344 (6.8 g) were blended until a homogenous mixture was obtained. BisGMA was heated using a hot air gun, as it was too viscous to be handled at room temperature. The viscosity of the acrylate mixture was sufficiently low for efficient stirring at room temperature. A solution of lithium trifluoromethanesulfonate (=lithium triflate) (9.8 g) in water (12 g) was dropwise added to the mechanically vigorously stirred TEGDMA/BisGMA/SR344 mixture. A clear and homogenous formulation was obtained. Finally, photoinitiator Irgacure 819 (2 g) was added under stirring. The formulation was left to stir in the dark until all photoinitiator was dissolved.

The curable product obtained had the following composition:

| | |
|---|---|
| TEGDMA | 53.6 wt % |
| BisGMA | 31.3 wt % |
| SR344 | 3.4 wt % |
| Water | 5.9 wt % |
| LiCF₃SO₃ | 4.9 wt % |
| Irgacure 819 | 1.0 wt % |

The composition obtained had the following conductivity and low shear viscosity values:

| | |
|---|---|
| Conductivity: | σ(21° C.) = 135 µS/cm |
| | σ(34° C.) = 258 µS/cm |
| Low shear viscosity: | η(22° C.) = 70 mPas |

Example 4

The following composition was prepared (PRUV-15)

TEGDMA (5.6 g), HEMA (85.2 g) and BisGMA (85.2 g) were blended until a homogenous mixture was obtained. BisGMA was heated using a hot air gun, as it was too viscous to be handled at room temperature. The viscosity of the acrylate mixture was sufficiently low for efficient stirring at room temperature. A solution of lithium triflate (8.8 g) in water (15.2 g) was dropwise added to the mechanically vigorously stirred TEGDMA/BisGMA mixture. A clear and homogenous formulation was obtained. Finally, photoinitiator Irgacure 819 (2 g) was added under stirring. The formulation was left to stir in the dark until all photoinitiator was dissolved.

The curable product obtained had the following composition:

| | |
|---|---|
| TEGDMA | 2.8 wt % |
| BisGMA | 42.6 wt % |
| HEMA | 42.6 wt % |
| Water | 7.5 wt % |
| LiCF₃SO₃ | 4.4 wt % |
| Irgacure 819 | 1.0 wt % |

The composition obtained had the following conductivity and low shear viscosity values:

| | |
|---|---|
| Conductivity: | σ(22° C.) = 269 µS/cm |
| Low shear viscosity: | |

The low shear viscosity of the product obtained was measured as a function of temperature at Anton Paar (Austria) using a ball-drop viscosimeter. The measured values at different temperatures were as follows:

$\eta(20° C.) = 119$ mPas;
$\eta(30° C.) = 61$ mPas;
$\eta(40° C.) = 35$ mPas;
$\eta(50° C.) = 22$ mPas.

Example 5

The following composition was prepared:

TEGDMA (5.6 g), HEMA (85.2 g) and BisGMA (85.2 g) were blended until a homogenous mixture was obtained. Usually, BisGMA was heated using a hot air gun, as it was too viscous to be handled at room temperature. The viscosity of the acrylate mixture was sufficiently low for efficient stirring at room temperature. A solution of lithium triflate (8.8 g) in water (15.2 g) was dropwise added to the mechanically vigorously stirred TEGDMA/BisGMA mixture. A clear and homogenous formulation was obtained. Photoinitiator Irgacure 819 (2 g) was added under stirring. The formulation was left to stir in the dark until all photoinitiator was dissolved. Finally 0.2 g of wetting agent BYK UV3510 (0.1% on the total weight of the previously mentioned components) was added under gentle stirring. The solution was left to stir until a homogeneous mixture was obtained.

The curable product obtained had the following composition:

| | |
|---|---|
| TEGDMA | 2.8 wt % |
| BisGMA | 42.1 wt % |
| HEMA | 42.1 wt % |
| Water | 7.5 wt % |
| LiCF₃SO₃ | 4.4 wt % |
| Irgacure 819 | 0.1 wt % |
| BYK UV3510 | 1.0 wt % |

The invention claimed is:

1. A method for printing a fluid material using a continuous jet printing technique, wherein the material is passed under pressure from a reservoir through a channel to at least one outflow opening of the channel, after which the material is passed through the outflow opening, whereby the pressure in at least a part of the channel upstream of the outflow opening is in the interval of 15-600 bars [≡15 10⁵ to 600 10⁵ Pa], and whereby the fluid material comprises a curable composition which at the time of flowing out through the outflow opening has a shear viscosity at 22° C. in a range of 150-400 mPas and comprises
  (a) a component A in an amount in the range of from 1-15 wt % which component A has a dielectric constant larger than 15 (at 0° C.), (b) an ionically dissolved lipophilic salt in an amount in the range of from 1-15 wt %, (c) optionally (a) coating additive(s) in an amount of at most 10 wt %, and
  (d) for the remaining part a liquid component B which comprises a curable monomer and/or a curable oligomer, which liquid component B has a shear viscosity (at 22° C.) in the range of from 50-1500 mPas, whereby liquid components A and B are compatible with each other, and all amounts are based upon total composition.

2. A method according to claim 1, wherein the material at the time of flowing out through the outflow opening has a viscosity which is in the interval of 50 to 400 mPas.

3. A method according to claim 1, wherein the liquid component B has a shear viscosity (at 22° C.) in the range of from 50-1000 mPas.

4. A method according to claim 1, wherein the liquid component B has a shear viscosity (at 22° C.) in the range of from 50-500 mPas.

5. A method according to claim 1, wherein the liquid component B is present in the fluid material in an amount of 30 to 90 wt. %.

6. A method according to claim 1, wherein the curable composition has a shear viscosity (at 22° C.) in the range of from 50-500 mPas.

7. A method according to claim 1, wherein the curable monomer is chosen from the group consisting of methacrylates, acrylates, epoxies, oxetanes, epoxy/acid combinations, epoxy/amine combinations, vinyl derivatives, maleimides, and allyl derivatives, and mixtures thereof.

8. A method according to claim 1, wherein the methacrylate and/or acrylate is chosen from the group consisting of BisGMA, HEMA, TEGDMA, SR344 (Cray Valley), ethylene glycol based acrylates, DPGDA, TPGDA, TIEGDA, PON-PGDA, TCDDMDA, oligo(ether) acrylates, poly(ether) acrylates, urethane acrylates, epoxy acrylates, amine-acrylates and polyester acrylates, and mixtures thereof.

9. A method according to claim 1, wherein the curable oligomer is chosen from the group consisting of acrylated urethanes, epoxies, epoxides, epoxy acrylates, oxetanes, phenolics, carbonates, ethers, polyesters and/or acrylics, with any grade of functionality and mixtures thereof.

10. A method according to claim 1, wherein the lipophilic salt is chosen from the group consisting of Lithium salts, tetra-alkyl-ammonium salts, alkyl sulphonates, derivatives of alkyl sulphonates, alkyl sulphates, derivatives of alkyl sulphates, alkyl benzyl sulphonates, derivatives of alkyl benzyl sulphonates, alkyl benzyl sulphates, derivatives of alkyl benzyl sulphates, tetrabenzylic ammonium salts, derivatives of tetrabenzylic ammonium salts, trialkyl monobenzylic ammonium salts, derivatives of trialkyl monobenzylic ammonium salts, di-alkyl dibenzylic ammonium salts, derivatives of di-alkyl dibenzylic ammonium salts, mono-alkyl tri-benzylic ammonium salts, derivatives of mono-alkyl tri-benzylic ammonium salts, salts of cholic acid, salts of derivatives of cholic acid, derivatives of salts of cholic acid, derivatives of salts of derivatives of cholic acid, digitonins, derivatives of digitonins, docusates, derivatives of docusates, sarcosine, derivatives of sarcosine, benzalkonium salts, derivatives of benzalkonium salts, thonzonium salts, derivatives of thonzonium salts, salts of fatty acids and derivatives of salts of fatty acids, and mixtures thereof.

11. A method according to claim 10, wherein the Li-salt is chosen from the group consisting of $LiClO_4$, $LiCF_3SO_3$ (LiTf), LiI, LiBr, $LiPF_6$ and $LiBF_4$, and mixtures thereof.

12. A method according to claim 1, wherein the curable composition further comprises a compatibilizer.

13. A method according to claim 1, wherein the dielectric constant of component A is in the range from 15-89.7 (at 0° C.).

14. A method according to claim 1, wherein the component A is chosen from the group consisting of water, methanol, ethanol, DMSO, 1-propanol, 1-butanol, formamide, acetone, MEK, acetonitril, N,N-dimethylformamide (DMF), methyl pyrrolidones and formic acid and mixtures thereof.

15. A method according to claim 1, wherein the curable composition further comprises an activator, in an amount of up to 10 wt. %, based on total composition.

16. A method according to claim 1 for preparing a 2D- or 3D-article, wherein the article is prepared by depositing droplets of the fluid material on a substrate, wherein the droplets are allowed to cure when deposited on the substrate.

17. A method according to claim 1, wherein use is made of an apparatus which comprises a reservoir for storing the fluid material, a channel connected with the reservoir, which is provided with at least one outflow opening from which, in use, flows a jet of the fluid material breaking up into drops, and a pressure regulating mechanism for varying the pressure of the fluid material upstream of the outflow opening for the purpose of obtaining the jet breaking up into drops, the apparatus being further provided with pressure generating means for passing the fluid material under a predetermined pressure through the channel in the direction of the outflow opening, whereby the pressure generating means are arranged for applying the predetermined pressure to the fluid material in the channel hydraulically and/or pneumatically.

18. A curable composition as defined in claim 1.

19. An article comprising a curable composition according to claim 18, which article is cured.

20. A method of claim 1, wherein the curable composition has a shear viscosity at 22° C. in a range of 50-1000 mPas.

21. A method of claim 20, wherein the curable composition has a shear viscosity at 22° C. in a range of 50-100 mPas.

* * * * *